Figure 1:
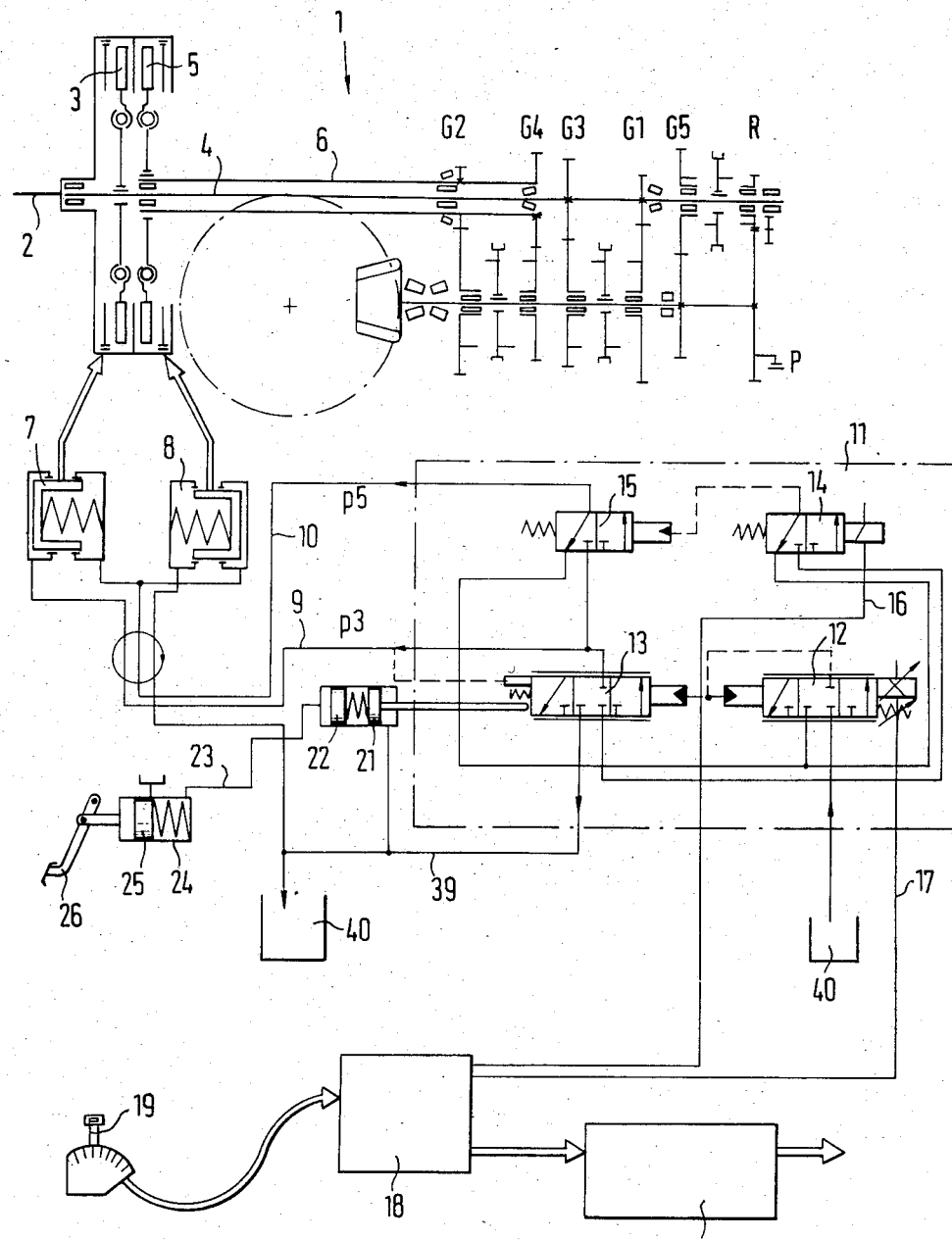

United States Patent [19]

Bardoll et al.

[11] Patent Number: 4,632,234
[45] Date of Patent: Dec. 30, 1986

[54] CONTROL SYSTEM FOR A DOUBLE CLUTCH OF A POWER-SHIFTABLE MOTOR VEHICLE TRANSMISSION

[75] Inventors: Meinrad Bardoll, Gaggenau; Kurt-André Leibold, Hemmingen, both of Fed. Rep. of Germany

[73] Assignee: Dr. Ing.h.c.f. Porshe Aktiengesellschaft, Stuttgart, Fed. Rep. of Germany

[21] Appl. No.: 677,749

[22] Filed: Dec. 3, 1984

[30] Foreign Application Priority Data

Dec. 3, 1983 [DE] Fed. Rep. of Germany ....... 3343827

[51] Int. Cl.⁴ ........................ B60K 41/22; F16D 25/10
[52] U.S. Cl. ................................... 192/3.58; 192/3.62; 192/87.18
[58] Field of Search ................... 192/0.092, 3.51, 3.52, 192/3.54, 3.55, 3.57, 3.58, 3.61, 3.62, 87.15, 87.14, 48.9, 48.91, 87.18; 60/280, 453, 459, 460; 137/596.16; 251/63.4

[56] References Cited

U.S. PATENT DOCUMENTS 4,293,059 10/1981 Lucas ................................. 192/3.57
4,513,850 4/1985 Plate ..................................... 192/358

OTHER PUBLICATIONS

VDI–Berichte (VDI Reports), No. 466, 1983, An Electronic Control of a Double Clutch Transmission, by P. Op de Beeck, N. Stelter and B. Bofinger.

Primary Examiner—George H. Krizmanich
Attorney, Agent, or Firm—Barnes & Thornburg

[57] ABSTRACT

A control system for a double clutch of a power-shiftable motor vehicle transmission, in which both clutches are hydraulically actuated by an electro-hydraulic control system which is controlled by an electronic control apparatus according to a predetermined program responding to the signals of a speed selector lever. For starting, the control system is adapted to be additionally manually influenceable by a clutch pedal which acts by way of a hydraulic transmitter cylinder and a receiver cylinder on the control slide valve member of the control system.

17 Claims, 2 Drawing Figures

CONTROL SYSTEM FOR A DOUBLE CLUTCH OF A POWER-SHIFTABLE MOTOR VEHICLE TRANSMISSION

The present invention relates to a control system for a double clutch of a motor vehicle change-speed transmission adapted to be shifted in dependence on the load, in which several speeds are each coordinated to a clutch and are adapted to be connected with the engine shaft by way of the respective clutch and in which the clutches are hydraulically actuated by an electro-hydraulic control system which, in turn, is controlled by an electronic control apparatus.

Such a motor vehicle transmission is described in the VDI-Berichte (VDI-Reports), No. 466,1983, pages 101 to 108. The input to the transmission is subdivided into two coaxial shafts whereby each shaft is connected with a clutch. The speeds or gears G1, G3, G5 are coordinated to one shaft, respectively, clutch and the speeds or gears G2, G4, R are coordinated to the other shaft, respectively, clutch. By actuation of the corresponding clutch, it is possible to shift from a speed of the one shaft to a speed of the other shaft without interruption of power transmission. For that purpose, the clutches are hydraulically actuated with pressure by way of a control installation. The control installation is controlled by an electro-hydraulic control apparatus, in which a predetermined control program is stored and which responds to signals of a speed selector lever. This automatic shifting system which is designed for normal operation of the motor vehicle, operates nonsatisfactorily in particular driving situations, as may occur, for example, during the starting of the motor vehicle.

It is the object of the present invention to construct such a motor vehicle transmission so as to be adaptable to extreme driving conditions.

The underlying problems are solved according to the present invention in that the clutches are manually actuatable by way of a clutch pedal which interacts additionally on the control installation enlarged by a subassembly.

Since the electro-hydraulic control installation, on which only acts the electronic control apparatus during normal driving operation, is adapted to be influenced additionally by a selectively actuatable clutch pedal, the shifting of the clutches can take place corresponding to the respective driving situation in such a manner that, for example, the shifting time is somewhat lengthened or shortened or that the clutches drag over longer periods of time and thereby transmit only a portion of the engine torque.

The control installation according to this invention includes a transmitter cylinder connected with the clutch pedal and a receiver cylinder connected with the transmitter cylinder by way of a hydraulic line as well as an electro-hydraulic pressure regulator with a control slide valve which valves a clutch pressure channel, a return channel to the hydraulic reservoir tank and a pilot control pressure channel. The piston of the receiver cylinder, which is longitudinally displaceable during pressure actuation, engages by way of a spring system and a plunger at one side of the control slide valve member whereas the actuating force determined by the control apparatus acts on the other side of the control slide valve member by way of a pilot pressure-regulator. In this manner, the pressure on the clutch can be adjusted in a delicately sensitive manner in dependence on the position of the clutch pedal and the torque transmitted at the clutches can be matched to the respective traffic conditions.

Further features of the present invention which in addition to the design and dimensioning of the spring system, refer to the constructive realization of the control installation in accordance with the present invention, will be described more fully hereinafter.

Figure 2:
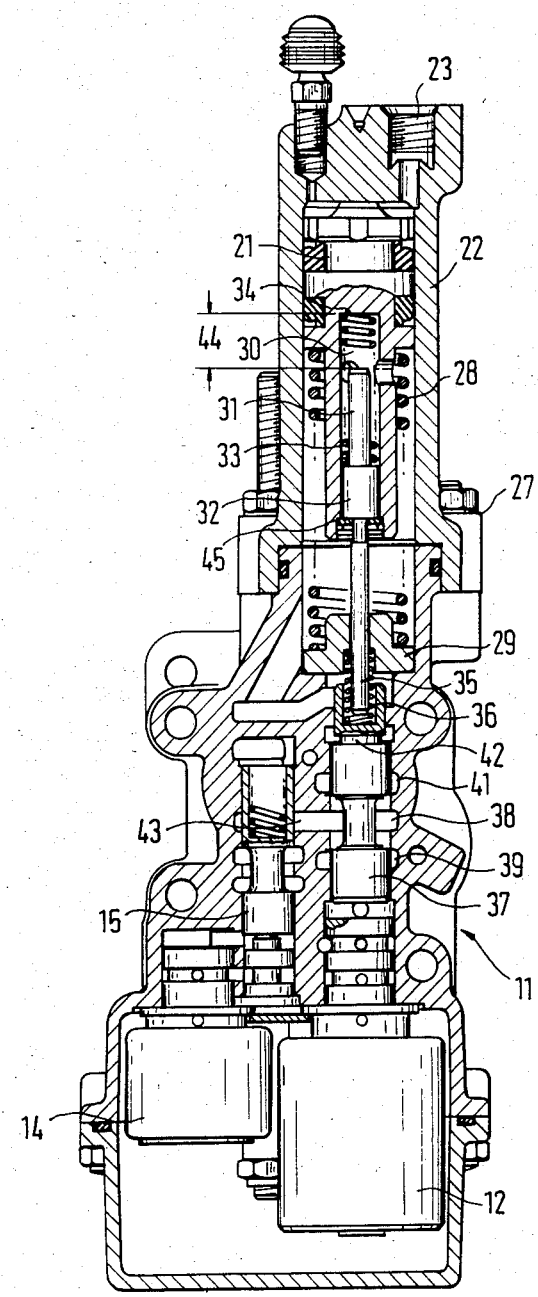

These and other objects, features and advantages of the present invention will become more apparent from the following description when taken in connection with the accompanying drawing which shows, for purposes of illustration only, one embodiment in accordance with the present invention, and wherein:

FIG. 1 is a schematic diagram of an electro-hydraulic control system for a double-clutch transmission in accordance with the present invention; and FIG. 2 is a cross-sectional view through an electro-hydraulic control installation in accordance with the present invention.

Referring now to the drawing wherein like reference numerals are used throughout the two views to designate like parts, a motor vehicle transmission generally designated by reference numeral 1 which is adapted to be shifted as a function of load, can be connected with the engine shaft 2 by means of a hydraulically actuated double-clutch. The forward speeds G3, G1, G5 and the reverse speed R are adapted to be coupled by means of the one clutch 3 by way of an inner shaft 4, whereas the forward speeds G2 and G4 are adapted to be coupled by means of the other clutch 5 by way of a hollow shaft 6. The clutch 3 is acted upon with pressure by way of a hydraulic cylinder 7 while the clutch 5 is adapted to be acted upon with pressure by way of a hydraulic cylinder 8. The two hydraulic cylinders 7 and 8 are connected by way of separate lines 9 and 10 with an electro-hydraulic control installation 11 which supplies as output magnitudes a pressure P3 for the clutch 3 and a pressure P5 for the clutch 5. The control installation 11 includes an electro-hydraulic pilot pressure-regulator 12, a hydraulic pressure regulator 13 as well as an electro-hydraulic shifting valve 14 and an hydraulic 3/2 shifting valve 15 for shifting the clutch 5.

The electromagnets of the pilot control pressure regulator 12 and the shifting valve 14 are connected by way of electric connecting lines 16 and 17 with an electronic control apparatus 18 of any conventional construction which is operatively connected with a speed selector lever 19 and which controls in dependence on the position of the speed selector lever 19, in addition to the clutch control, also the speed shifting actuation 20 according to a predetermined program.

The hydraulic pressure regulator 13 of the control installation 11 has a mechanical connection to the piston 21 of a receiver cylinder 22. This receiver cylinder 22 is connected by way of a hydraulic line 23 with a transmitter cylinder 24 whose piston 25 is displaceable together with a clutch pedal 26.

As can be seen in FIG. 2, the 3/2 shifting valve 15 is accommodated in the lower part of a housing 27 and parallel thereto also the pilot control pressure regulator 12 as well as the pressure regulator 13. The upper part of the housing 27 is constructed as receiver cylinder 22 in which the piston 21 is guided longitudinally displaceable. A return spring 28 opposes the longitudinal displacement of the piston 21, which is supported against an abutment ring 29 supported in the housing 27. The one end 31 of a plunger 32 projects into a concentric bore 30 of the piston 21, while a control spring 33 is mounted over the one end 31 of the plunger 32; the control spring 33 is supported at the end of the bore 31 against the bottom 34 of the piston 21. A compression spring 36 is centered on the other end 35 of the plunger 32 which extends through the abutment ring 29; the compression spring 36 is stressed between the abutment ring 29 and a spool-type control slide valve member 37 whereby the plunger end 35 has a slight axial spacing with respect to the control slide valve member 37. The control slide valve member 37 controls a clutch pressure channel or duct 38 with which is connected the line 9 for the clutch pressure P3 and also the line 10 for the clutch pressure P5 by way of the shifting valve 15. The control slide valve member 37 additionally controls a return channel or duct 39 to the reservoir tank 40 for hydraulic liquid and a pressure feed channel 41. The spool-type control slide valve member 37 is provided with a pressure-actuating surface 42, formed by a reduced diametric dimension, which is connected with the clutch pressure channel 38 by way of a pressure return channel 43.

During the normal driving operation, the clutch pedal 26 is not actuated. The clutches and speeds are automatically shifted after preselection of the speed selector lever 19. In contrast thereto, during the starting, it is appropriate to provide for the driver the possibility to be able to match manually the shifting of the clutch to the prevailing traffic, respective road situation. For that purpose, the driver depresses fully the clutch pedal 26 during the beginning of the starting operation so that the piston 25 of the transmitter cylinder 24 and by way of the hydraulic line 23, also the piston 21 of the receiver cylinder as well as the plunger 32 are displaced so far until the spool-type control slide valve member 37 opens up the connection from the clutch pressure channel 38 to the return channel 39. Since the clutch pressure is thus decreased, the clutch 3 is disengaged and the first speed G1 or also the reverse speed R to be used during the starting of the drive is decoupled from the engine shaft 2.

A reverse movement of the pistons 25 and 21 of the transmitter cylinder 24 and of the receiver cylinder 22 and therewith also an unstressing of the control spring 33 takes place by a slow retraction of the clutch pedal 26 so that the control slide valve member 37 can be pushed back by the control pressure acting on the same from the pilot pressure regulator 12. At the end of this operating movement, the clutch pressure channel 38 is in communication with the pressure feed channel 41. As a result thereof, the pressure in the clutch pressure channel 38 increases to such an extent until the return force resulting from the force at the pressure-actuating surface 42 and the force of the return spring 33 is in equilibrium with the actuating force effected by the control pressure. The control slide valve member 37 assumes an intermediate position; it closes the pressure feed channel 41 and the return channel 39. The clutch 3 is acted upon with the thus-adjusted clutch pressure, as a result of which the desired starting torque which is to be transmitted by the same, will be adjusted for the clutch 3. This control operation repeats itself during a further retraction of the clutch pedal 26 for such length of time until with the termination of the starting operation, the piston is returned into the starting position by the return spring 28 and the control slide valve member 37 is only under the effect of the actuating force determined by the control apparatus 18 and applied by way of the pilot pressure regulator 12 and of the force produced by the actuating surface 42.

The spacing 44 between the plunger end 31 and the bottom 34 of the piston 21 is chosen so large that, on the one hand, the regulating function is assured during the starting of the motor vehicle but, on the other hand, in case of a defective regulating function, be it by breakage of the control spring 33 or jamming of the control slide valve member 37, a mechanical entrainment of the control slide valve member 37 takes place by the piston 21 until the clutch pressure channel 38 is connected with the return channel 39 and thus the clutch 3 is disengaged.

In order not to prevent the automatic electro-hydraulic regulation, respectively, clutch control after termination of the starting operation, the plunger 32 is connected with the piston 21 by an entrainment disk 45 and returns with the same into the starting position so that it no longer has any influence on the control slide valve member 37.

While we have shown and described only one embodiment in accoradnce with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A control system for a double clutch of a motor vehicle change speed transmission operable to be shifted as a function of load, comprising two clutch means each coordinated to several speeds and operable to connect the individual speeds with an engine shaft, an electro-hydraulic control means for hydraulically actuating the clutch means in response to pressure in a clutch pressure channel, an electronic control means electrically controlling the electro-hydraulic control means, a speed selector lever means, the electronic control means being responsive to signals of the speed selector lever means, means for manually actuating the clutch means by way of a clutch pedal which acts on the electro-hydraulic control means, wherein the electro-hydraulic control means includes a transmitter cylinder means connected with the clutch pedal, a receiver cylinder means, a hydraulic line connecting the transmitter cylinder means with the receiver cylinder means, an electro-hydraulic pilot pressure regulator means influenced by the electronic control means, and a hydraulic pressure regulator means including control slide valve means operable to valve the clutch pressure channel to control the amount of clutch actuation and by connecting and isolating the clutch pressure channel to a return channel leading to a reservoir tank and a pressure feed channel wherein said receiver cylinder means includes a longitudinally displaceable piston operable to engage by way of spring means and a plunger means at one side of the control slide valve means whereas the clutch actuating pressure is determined by the electronic control means acting by way of the pilot pressure regulator means on the other side of the control slide valve means.

2. A control system according to claim 1, wherein the receiver cylinder means together with the spring means and the plunger means as well as the hydraulic pressure regulator means, the pilot pressure regulator means and a 3/2 shifting valve means are accommodated in a common housing means.

3. A control system according to claim 2, wherein the spring means includes an outer return spring, by means of which the piston means in the receiver cylinder means is supported at an abutment ring abutting at the housing means, an inner control spring concentric thereto which abuts in a concentric bore of said last-mentioned piston means against the bottom thereof and at the other end thereof against one end of the plunger means projecting into the bore, and a compression spring which is arranged at the other plunger end extending through the abutment ring and is supported, on the one hand, at the abutment ring and, on the other, at the control slide valve means.

4. A control system according to claim 3, wherein the control spring is so dimensioned that its spring force in the end displacement position of the piston means of the receiver cylinder means is larger than the control force so that it displaces the control slide valve means by way of the plunger means, so far until the clutch pressure channel is connected with the return channel.

5. A control system according to claim 4, wherein the one plunger end has such a spacing with respect to the bottom of the piston means of the receiver cylinder means that the control function is assured during normal operation whereas with a defective control function an entrainment of the control slide valve means takes place for such length of time until the clutch pressure channel is connected with the return channel.

6. A control system with a housing means according to claim 4, wherein the spring means includes an outer return spring, by means of which the piston means in the receiver cylinder means is supported at an abutment ring abutting at the housing means, an inner control spring concentric thereto which abuts in a concentric bore of said last-mentioned piston means against the bottom thereof and at the other end thereof against one end of the plunger means projecting into the bore, and a compression spring which is arranged at the other plunger end extending through the abutment ring and is supported, on the one hand, at the abutment ring and, on the other, at the control slide valve means.

7. A control system according to claim 6, wherein the control spring is so dimensioned that its spring force in the end displacement position of the piston means of the receiver cylinder means is larger than the control force so that it displaces the control slide valve means by way of the plunger means, so far until the clutch pressure channel is connected with the return channel.

8. A control system according to claim 4, wherein the one plunger end has such a spacing with respect to the bottom of the piston means of the receiver cylinder means that the control function is assured during normal operation whereas with a defective control function an entrainment of the control slide valve means takes place for such length of time until the clutch pressure channel is connected with the return channel.

9. A control system for a double clutch of a motor vehicle channel speed transmission operable to be shifted as a function of load, comprising two clutch means each coordinated to several speeds and operable to connect the individual speeds with an engine shaft, an electro-hydraulic control means for hydraulically selectively engaging the clutch means, an electronic control means electrically controlling the electro-hydraulic control means by causing a first force to be applied thereto, a speed selector lever means, the electronic control means being responsive to signals of the speed selector lever means, clutch pedal means for causing a second force to be applied to the electro-hydraulic control means in opposition to the first force of the electronic control means to cause the electro-hydraulic control means to determine the amount of clutch engagement and alternatively to disconnect the clutch means when the clutch pedal force continues to exceed the electronic control force.

10. A control system according to claim 9, wherein the clutch pedal means includes a transmitter cylinder means connected with the clutch pedal, a receiver cylinder means producing the second force, a hydraulic line connecting the transmitter cylinder means with the receiver cylinder means, an electro-hydraulic pilot pressure regulator means influenced by the electronic control means to produce the first force and wherein the electro-hydraulic control means includes a control slide valve means operable in response to the first and second forces to valve a clutch actuating pressure channel, a return channel leading to a reservoir tank and a pressure feed channel.

11. A control system according to claim 10, wherein said receiver cylinder means incudes a longitudinally displaceable piston operable to engage the control slide valve by way of spring means and a plunger means at one side of the control slide valve means and whereas the first force determined by the electronic control means acts by way of the pilot pressure regulator means on an opposite side of the control slide valve means.

12. A control system according to claim 11, wherein the spring means includes an outer return spring, by means of which the piston means in the receiver cylinder means is supported at an abutment ring abutting at a housing means, an inner control spring concentric thereto which abuts in a concentric bore of said last-mentioned piston means against the bottom thereof and at the other end thereof against one end of the plunger means projecting into the bore, and a compression spring which is arranged at the other plunger end extending through the abutment ring and is supported, on the one hand, at the abutment ring and, on the other, at the control slide valve means.

13. A control system according to claim 12, wherein the control spring is so dimensioned that its spring force in the end displacement position of the piston means of the receiver cylinder means is larger than the first force so that it displaces the control slide valve means by way of the plunger means, so far until the clutch pressure channel is connected with the return channel.

14. A control system according to claim 13, wherein the one plunger end has such a spacing with respect to the bottom of the piston means of the receiver cylinder means that the control function is assured during normal operation whereas with a defective control function an entrainment of the control slide valve means takes place for such length of time until the clutch pressure channel is connected with the return channel.

15. A control system with a housing means according to claim 11, wherein the spring means includes an outer return spring, by means of which the piston means in the receiver cylinder means is supported at an abutment ring abutting at the housing means, an inner control spring concentric thereto which abuts in a concentric bore of said last-mentioned piston means against the bottom thereof and at the other end thereof against one end of the plunger means projecting into the bore, and a compression spring which is arranged at the other plunger end extending through the abutment ring and is supported, on the one hand, at the abutment ring and, on the other, at the control slide valve means.

16. A control system according to claim 15, wherein the control spring is so dimensioned that its spring force in the end displacement position of the piston means of the receiver cylinder means is larger than the first force so that it displaces the control slide valve means by way of the plunger means, so far until the clutch pressure channel is connected with the return channel.

17. A control system according to claim 11, wherein the one plunger end has such a spacing with respect to the bottom of the piston means of the receiver cylinder means that the control function is assured during normal operation whereas with a defective control function an entrainment of the control slide valve means takes place for such length of time until the clutch pressure channel is connected with the return channel.

* * * * *